(12) United States Patent
Harada et al.

(10) Patent No.: US 11,419,085 B2
(45) Date of Patent: Aug. 16, 2022

(54) USER APPARATUS

(71) Applicant: NTT DOCOMO, INC., Tokyo (JP)

(72) Inventors: Hiroki Harada, Tokyo (JP); Naoki Fujimura, Tokyo (JP); Takuma Takada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/975,845

(22) PCT Filed: Feb. 22, 2019

(86) PCT No.: PCT/JP2019/006863
§ 371 (c)(1),
(2) Date: Aug. 26, 2020

(87) PCT Pub. No.: WO2019/167844
PCT Pub. Date: Sep. 6, 2019

(65) Prior Publication Data
US 2020/0413358 A1    Dec. 31, 2020

(30) Foreign Application Priority Data

Mar. 1, 2018  (JP) .............................. JP2018-036377

(51) Int. Cl.
*H04W 56/00* (2009.01)
*H04B 17/318* (2015.01)
(Continued)

(52) U.S. Cl.
CPC ........ *H04W 56/005* (2013.01); *H04B 17/318* (2015.01); *H04W 16/32* (2013.01); *H04W 24/10* (2013.01)

(58) Field of Classification Search
CPC ... H04W 56/005; H04W 16/32; H04W 24/10; H04B 17/318
(Continued)

(56) References Cited

U.S. PATENT DOCUMENTS

2014/0073331 A1* 3/2014 Lee ..................... H04W 72/048
455/444
2014/0315539 A1  10/2014 Kobayashi et al.
(Continued)

FOREIGN PATENT DOCUMENTS

EP      3 713 284 A1    9/2020
WO   2011/142715 A1   11/2011
(Continued)

OTHER PUBLICATIONS

International Search Report issued in PCT/JP2019/006863 dated Apr. 16, 2019 (4 pages).
(Continued)

*Primary Examiner* — Mong-Thuy T Tran
(74) *Attorney, Agent, or Firm* — Osha Bergman Watanabe & Burton LLP

(57) ABSTRACT

A user apparatus for communicating with a first base station apparatus using a first RAT (Radio Access Technology) and a second base station apparatus using a second RAT includes a reception unit configured to receive, from the first base station apparatus, a configuration for measuring a timing difference between a cell of the first base station apparatus and a cell of the second base station apparatus; a control unit configured to perform measurement with respect to a cell of the second RAT based on the configuration for measuring the timing difference; and a transmission unit configured to transmit, to the first base station apparatus, a result of the performed measurement, wherein the configuration for measuring the timing difference includes information indicating an upper limit of a number of cells of the second RAT.

4 Claims, 7 Drawing Sheets

(51) Int. Cl.
*H04W 16/32* (2009.01)
*H04W 24/10* (2009.01)

(58) Field of Classification Search
USPC .......................................................... 370/329
See application file for complete search history.

(56) References Cited

U.S. PATENT DOCUMENTS

| | | | | |
|---|---|---|---|---|
| 2017/0201917 | A1* | 7/2017 | Han | H04W 76/36 |
| 2017/0257788 | A1* | 9/2017 | Takahashi | H04W 76/28 |
| 2018/0249463 | A1* | 8/2018 | Huang | H04W 76/27 |
| 2019/0215711 | A1* | 7/2019 | Tsai | H04W 56/0045 |
| 2019/0261444 | A1* | 8/2019 | Axmon | H04W 56/001 |
| 2020/0350975 | A1* | 11/2020 | Siomina | H04W 24/10 |
| 2020/0359251 | A1* | 11/2020 | Gunnarsson | H04W 24/10 |
| 2021/0051618 | A1* | 2/2021 | Yang | H04W 56/0065 |
| 2021/0067993 | A1* | 3/2021 | Kazmi | H04B 17/24 |

FOREIGN PATENT DOCUMENTS

| | | |
|---|---|---|
| WO | 2013/089058 A1 | 6/2013 |
| WO | 2016/007269 A1 | 1/2016 |
| WO | 2019/160266 A1 | 8/2019 |

OTHER PUBLICATIONS

Written Opinion of the International Searching Authority issued in PCT/JP2019/006863 dated Apr. 16, 2019 (4 pages).
Huawei, HiSilicon; "Discussion on SSTD measurement configuration for non-configured cell"; 3GPP TSG-RAN WG2 Meeting #101, R2-1802520; Athens, Greece; Feb. 26-Mar. 2, 2018 (4 pages).
Ericsson; "Introduction of inter-RAT SFID measurement requirement"; 3GPP TSG-RAN WG4 Meeting #86, R4-1802430; Athens, Greece; Feb. 26-Mar. 2, 2018 (4 pages).
Ericsson; "SFTD reporting for non-configured PSCell"; 3GPP TSG RAN WG4 Meeting #AH-1801, R4-1800940; San Diego, California, US; Jan. 22-26, 2018 (6 pages).
3GPP TR 38.804 V14.0.0; "3rd Generation Partnership Project; Technical Specification Group Radio Access Network; Study on New Radio Access Technology; Radio Interface Protocol Aspects (Release 14)"; Mar. 2017 (57 pages).
3GPP TS 37.340 V1.0.2; "3rd Generation Partnership Project; Technical Specification Group Radio Access Network; Evolved Universal Terrestrial Radio Access (E-UTRA) and NR; Multi-connectivity; Stage 2 (Release 15)"; Sep. 2017 (45 pages).
3GPP TS 36.331 V14.4.0; "3rd Generation Partnership Project; Technical Specification Group Radio Access Network; Evolved Universal Terrestrial Radio Access (E-UTRA): Raido Resource Control (RRC); Protocol specification (Release 14)"; Sep. 2017 (753 pages).
Extended European Search Report in counterpart European Application No. 19 76 0807.8 dated Oct. 27, 2021 (7 pages).
Notice of Reasons for Refusal issued in Japanese Application No. 2020-503474 dated Dec. 21, 2021 (5 pages).

* cited by examiner

USER APPARATUS

TECHNICAL FIELD

The present invention relates to a user apparatus in a wireless communication system.

BACKGROUND ART

Currently, in 3GPP (Third Generation Partnership Project), specifications have been developed for a new wireless communication system that is called "NR (New Radio Access Technology) system" as a successor of "LTE (Long Term Evolution) system" and "LTE-Advanced system" (e.g., non-patent document 1).

In the NR system, introduction of a technology called "LTE-NR Dual Connectivity" or "Multi-RAT (Multi Radio Access Technology) Dual Connectivity" has been discussed, in which, similar to the Dual Connectivity in the LTE system, data sets are divided between a base station of an LTE system (eNB) and a base station of an NR system (gNB) and the divided data sets are transmitted to or received by the base stations at the same time (e.g., non-patent document 2).

In addition, in the LTE-LTE dual connectivity, differences in the SFN (System Frame Number) and frame timing between the master node eNB and the secondary node eNB are measured by a user apparatus, and are reported to the network, which is referred to as SSTD (SFN and Subframe Timing Difference) or SFTD (SFN and Frame Timing Difference) (e.g., Non-Patent Document 3).

PRIOR ART DOCUMENTS

Non-Patent Document

[Non-Patent Document 1] 3GPP TR38.804 V14.0.0 (Mar. 2017)

[Non-Patent Document 2] 3GPP TS37.340 V1.0.2 (Sep. 2017)

[Non-Patent Document 3] 3GPP TS36.331 V14.4.0 (Sep. 2017)

SUMMARY OF THE INVENTION

Problem to be Solved by the Invention

In LTE-NR dual connectivity, when performing asynchronous dual connectivity, the user apparatus needs to perform measurements on NR carriers of the gNB because it is not clear how much of the frame, slot, or symbol timing difference exists between the master node eNB and the secondary node gNB. However, the procedure for this measurement has not been established.

The present invention has been made in view of the above, and is intended to enable a user apparatus to perform measurements for dual connectivity performed in a wireless communication system using a plurality of RATs.

Means for Solving the Problem

According to the disclosed technology, a user apparatus which communicates with a first base station apparatus using a first RAT (Radio Access Technology) and a second base station apparatus using a second RAT is provided. The user apparatus includes a reception unit configured to receive, from the first base station apparatus, a configuration for measuring a timing difference between a cell of the first base station apparatus and a cell of the second RAT, a control unit configured to perform a measurement for the second RAT cell based on the configuration for measuring the timing difference, and a transmission unit configured to transmit a result of the performed measurement to the first base station apparatus, wherein the configuration for measuring the timing difference includes information indicating an upper limit of a number of cells of the second RAT.

Advantageous Effects of Invention

According to the disclosed technology, it is possible for a user apparatus to perform measurements for dual connectivity performed in a wireless communication system using multiple RATs.

EMBODIMENTS FOR CARRYING OUT THE INVENTION

Figure 1:
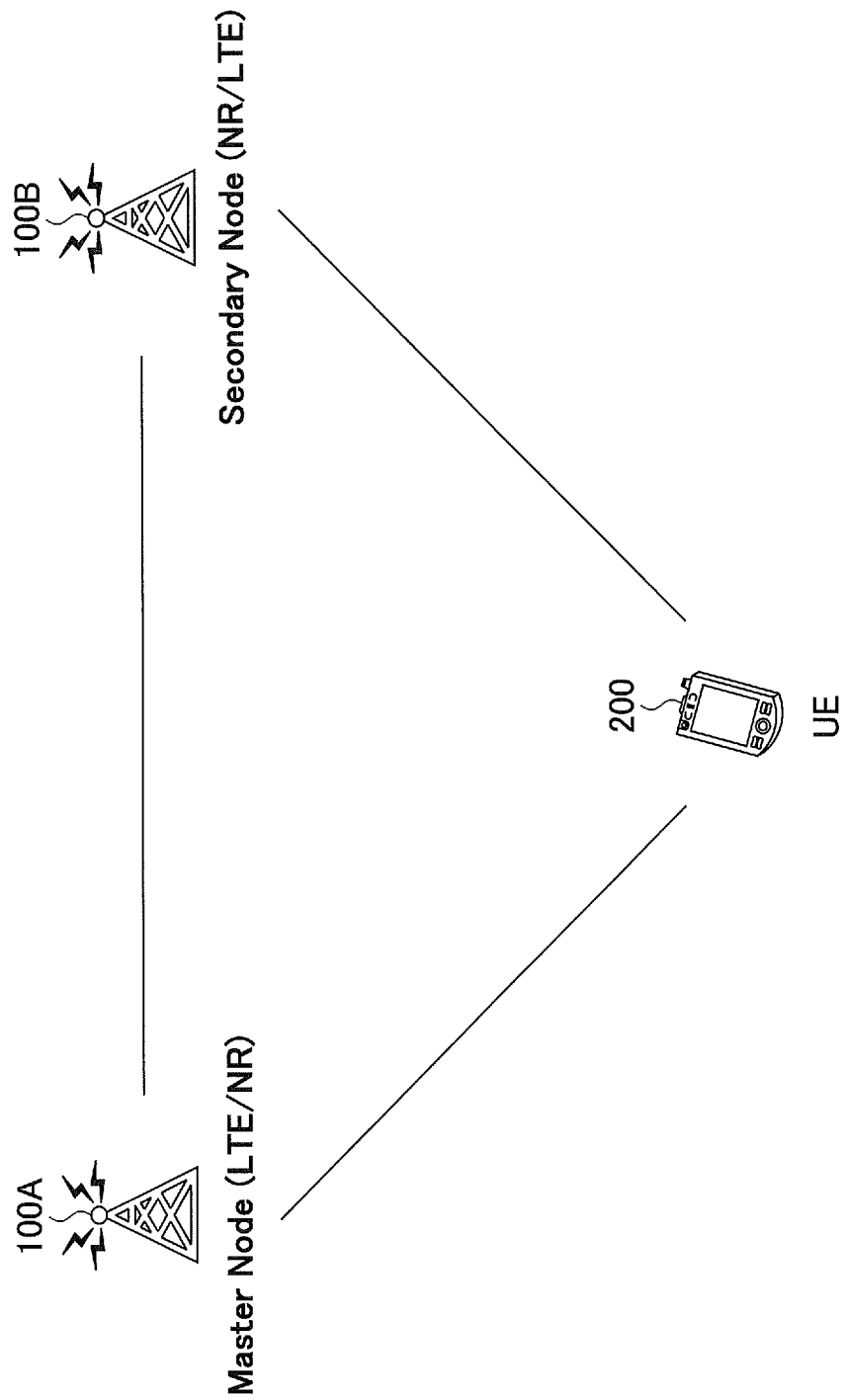
FIG. 1 is a drawing illustrating a configuration example of a wireless communication system according to an embodiment of the present invention.

In the following, referring to the drawings, one or more embodiments of the present invention will be described. It should be noted that the embodiments described below are examples. Embodiments of the present invention are not limited to the following embodiments.

In operations of a wireless communication system according to an embodiment of the present invention, conventional techniques will be used appropriately. With respect to the above, for example, the conventional techniques are related to, but not limited to, the existing LTE. Further, it is assumed that the term "LTE" used in the present specification has, unless otherwise specifically mentioned, a broad meaning including a scheme of LTE-Advanced and a scheme after LTE-Advanced (e.g., NR).

Further, in the following embodiments, the terms such as SS (Synchronization Signal), PSS (Primary SS), SSS (Secondary SS), PBCH (Physical broadcast channel), PRACH (Physical RACH), etc., are used for the sake of convenience. The signals, functions, etc., similar to the above, may be referred to by different terms.

Further, the above-described terms used in NR will be referred to as "NR-SS", "NR-PSS", "NR-SSS", "NR-PBCH", "NR-PRACH", etc.

FIG. 1 is a configuration example of a wireless communication system according to an embodiment of the present invention.

Referring to FIG. 1, an outline of a wireless communication system according to an embodiment of the present invention will be described.

As illustrated in FIG. 1, a user apparatus 200 (hereinafter referred to as a "UE 200") is connected to and communicates with a base station apparatus 100A and a base station apparatus 100B provided by the LTE system and the NR system, respectively (hereinafter, referred to as "base station apparatus 100" in the case of not distinguishing between the base station apparatus 100A and the base station apparatus 100B). Further, the user apparatus 200 supports LTE-NR dual connectivity in which the base station apparatus 100A is a master node and the base station apparatus 100B is a secondary node.

In other words, it is possible for the user apparatus 200 to perform simultaneous transmission to or simultaneous reception from the master base station apparatus 100A as a master node and the secondary base station apparatus 100B as a secondary node by simultaneously using a plurality of component carriers provided by the master base station apparatus 100A as a master node and the secondary base station apparatus 100B as a secondary node.

It should be noted that, although only one base station apparatus is illustrated for each of the LTE system and the NR system in FIG. 1, a number of base station apparatuses 100 are typically arranged in the LTE system or the NR system to cover each service area.

It should be noted that embodiments below will be described with respect to the LTE-NR dual connectivity. A user apparatus according to an embodiment of the present invention is not limited to be applicable to the LTE-NR dual connectivity, and may be applicable to dual connectivity between a plurality of wireless communication systems using different RATs, that is, the multi-RAT dual connectivity. Further, the user apparatus is also applicable to NR-NR dual connectivity using the same RAT.

Hereinafter, dual connectivity may be referred to as "DC".

It should be noted that, in an embodiment of the present invention, the duplex method may be TDD (Time Division Duplex), FDD (Frequency Division Duplex), or other methods (e.g., Flexible Duplex, or the like).

Further, in the following descriptions, "transmitting a signal by using a transmission beam" may be referred to as "transmitting a precoding-vector-multiplied signal (a signal precoded by a precoding vector)". Similarly, "receiving a signal by using a reception beam" may be referred to as "multiplying the received signal by a predetermined weight vector." Further, "transmitting a signal by using a transmission beam" may be expressed as "transmitting a signal via a specific antenna port". Similarly, "receiving a signal by using a reception beam" may be expressed as "receiving a signal via a specific antenna port". The antenna port refers to a logical antenna port or a physical antenna port defined in 3GPP standards. It should be noted that the method in which the transmission beam and the reception beam are formed are not limited to the methods described above. For example, a method may be used in which the base station apparatus 100 having plural antennas change each of the antenna angles and the user apparatus 200 having plural antennas change each of the antenna angles. A method in which the method of using precoding vectors and the method of changing antenna angles are combined may be used, or different antenna panels may be switched. The method of switching multiple antenna panels may be combined with other methods, or some other methods may be used. Further, for example, multiple transmission beams different from each other may be used in a high frequency band. An operation using multiple transmission beams is referred to as a "multi-beam operation", and an operation using a single transmission beam is referred to as a "single-beam operation".

Embodiment

In the following, one or more embodiments will be described.

Figure 2:
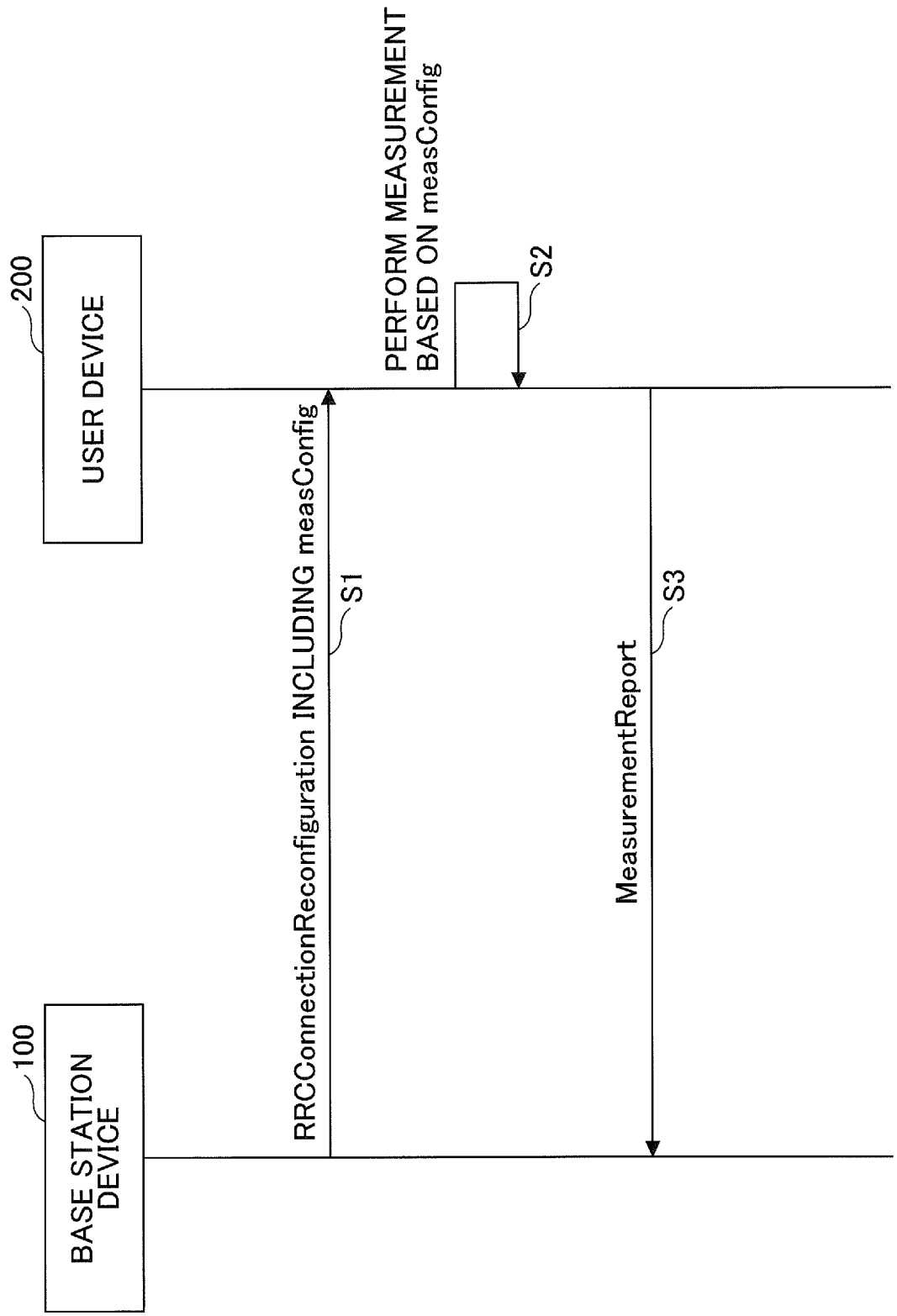
FIG. 2 is an example of a sequence of a measurement procedure in an embodiment of the present invention.

FIG. 2 is an example of a sequence of a measurement procedure in an embodiment of the present invention. In step S1, the base station apparatus 100 transmits "RRCConnectionReconfiguration" including an information element "measConfig" to the user apparatus 200 via an RRC message. The "measConfig" includes information related to a measurement configuration performed by the user apparatus 200. For example, information related to intra-frequency measurements, inter-frequency measurements, inter-RAT mobility measurements, measurement gap configuration, etc., may be included. It should be noted that "RRCConnectionReconfiguration" is an example. The "measConfig" may be indicated via another RRC message. For example, "measConfig" may be transmitted to the user apparatus 200 via "RRCConnectionResume".

In step S2, the user apparatus 200 performs measurements based on the configuration according to the measConfig received in step S1. Necessary measurements are performed on LTE cells or NR cells.

In step S3, the user apparatus 200 transmits the measurement results performed in step S2 to the base station apparatus 100 via an RRC message "MeasurementReport". The base station apparatus 100 performs the configuration of radio resources and scheduling required for the user apparatus 200 by referring to the received measurement results.

Here, it is assumed that an asynchronous DC is performed by an LTE node and an NR node. In the asynchronous DC, it is not known how much the radio frame, slot or symbol timing difference between the LTE node and the NR node is. In the LTE-LTE DC, SFTD measurements are supported in which SFN and sub-frame timing between the master node (also referred to as "PCell") and the secondary node (also referred to as "PSCell") are measured and reported to the base station apparatus 100 by the user apparatus 200. By performing the SFTD measurements, for example, the active period of DRX (Discontinuous reception) can be synchronized between the master node and the secondary node.

In the SSTD measurements of the LTE, the user apparatus 200 measures an SFN offset, a frame boundary offset, and a sub-frame boundary offset between PCell and PSCell, and reports the measured offsets to the base station apparatus 100. The following is an example of the RRC message "MeasResultSFTD" regarding the configuration of the SFTD measurements for the user apparatus 200.

```
MeasResultSSTD-r13 ::= SEQUENCE {
    Sfn-OffsetResult-r13 INTEGER (0..1023),
    FrameBoundaryOffsetResult-r13 INTEGER (-5..4),
    SubframeBoundaryOffsetResult-r13 INTEGER (0..127)
}
```

Sfn-OffsetResult is an information element that corresponds to the SFN offset and takes values from 0 to 1023. FrameBoundaryOffsetResult is an information element that corresponds to the frame boundary offset and takes values from −5 to 4. Subframe BoundaryOffsetResult is an information element that corresponds to the sub-frame boundary offset and takes values from 0 to 127. The base station apparatus 100 causes the user apparatus 200 to measure and report "MeasResultSSTD" after configuring the PSCell.

With respect to the above, in order for the user apparatus 200 to configure PSCell, it is necessary to perform cell detection and report to the base station apparatus 100. In an asynchronous DC in LTE, PSCell is configured by the following procedure.

1) Inter-frequency measurement with a measurement gap is configured to the user apparatus 200 by the master node.
2) The master node recognizes a PSCell ID from the measurement report results and configures PSCell to the user apparatus 200.
3) The master node configures SSTD measurements for the user apparatus 200.
4) The master node recognizes a timing offset between the master node and the secondary node based on the SSTD measurement result report from the user apparatus 200 and shares the timing offset with the secondary node.

Figure 3:
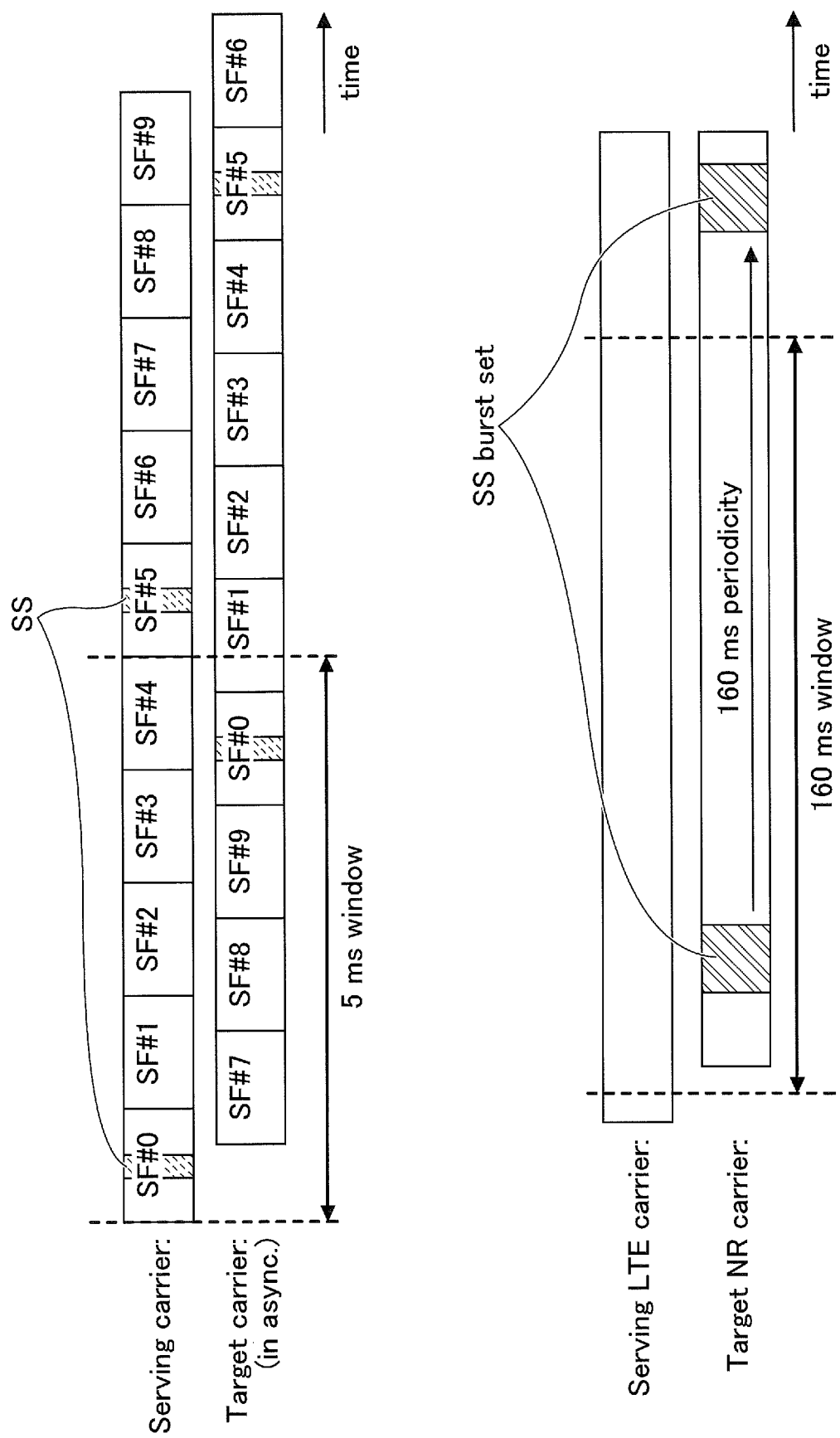
FIG. 3 is a drawing illustrating an example (1) of a measurement procedure in an asynchronous DC according to an embodiment of the present invention.

FIG. 3 is a drawing illustrating an example (1) of a measurement procedure in an asynchronous DC according to an embodiment of the present invention.

The operation of applying the procedure of the LTE-LTE asynchronous DC described in FIG. 2 to the LTE-NR asynchronous DC will be described.

In the case where the measurement target is an LTE carrier used for performing the asynchronous DC, the Inter-frequency measurement with a measurement gap is configured to the user apparatus 200 by the master node of the LTE. As illustrated in the upper figure of FIG. 3, the transmission period of the synchronous signal is 5 ms in LTE, so that the measurement can be performed in a window of 5 ms even when the master node and the secondary node are asynchronous. In the upper figure of FIG. 3, the synchronization signal SS (Synchronization Signal) is detected at SF (subframe) #0 and SF #5. That is, the 5 ms window contains at least one SS transmitted by SF #0 or SF #5.

On the other hand, in the case where the measurement target is an NR carrier used for performing asynchronous DC, the Inter RAT NR measurement with a measurement gap is configured to the user apparatus 200 by the master node of the LTE. As illustrated in the lower figure of FIG. 3, in NR, 5 ms, 10 ms, 20 ms, 40 ms, 80 ms, or 160 ms can be set as the transmission period of an SS block including a synchronization signal, so that a window of 160 ms is required to detect the synchronization signal when the master node and the secondary node are asynchronous. That is, the window of 160 ms contains at least one SS burst set. It should be noted that the SS burst set includes one or more SS blocks.

Figure 4:
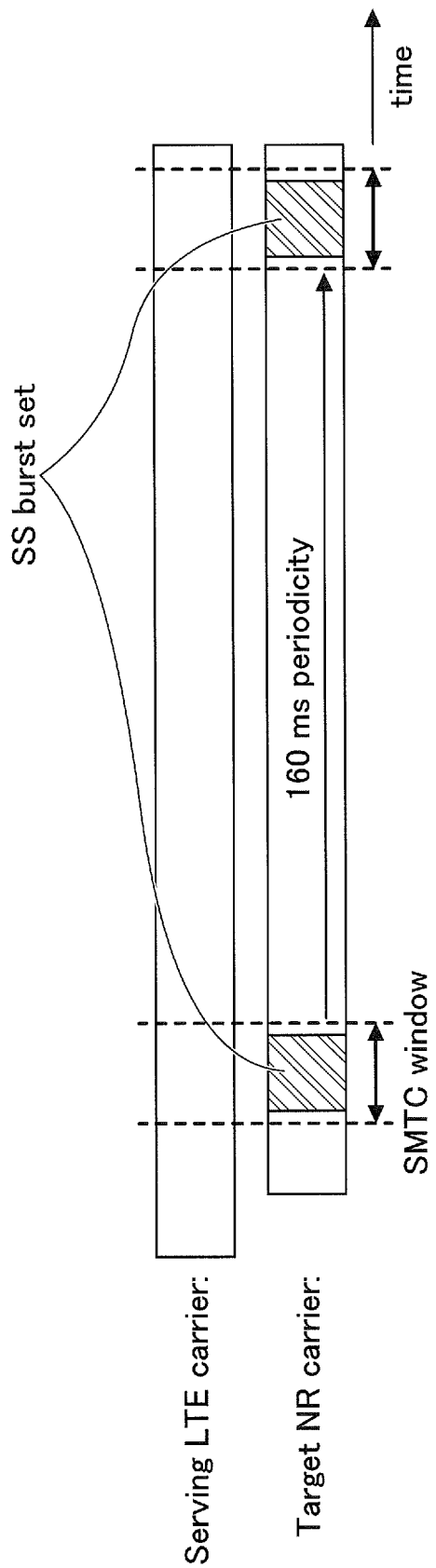
FIG. 4 is a drawing illustrating an example (2) of a measurement procedure in an asynchronous DC according to an embodiment of the present invention.

FIG. 4 is a drawing illustrating an example (2) of a measurement procedure in an asynchronous DC according to an embodiment of the present invention. As described in FIG. 3, in the NR, because the transmission period of the SS block can be set from 5 ms to 160 ms, in the case where the measurement target is an NR carrier and an NR PSCell is configured, the required measurement gap length in the inter-RAT measurement is increased.

Here, if the timing difference between the master node and the secondary node is obtained by the network in advance by the SSTD measurement, it is possible to configure an appropriate measurement timing to the user apparatus 200. As illustrated in FIG. 4, the SMTC (SS block measurement timing control) window can be set to be shorter than the SS burst transmission periodicity, by including the duration in which the SS burst set is transmitted. However, the user apparatus 200 cannot perform the SSTD measurement unless the PSCell is configured.

Therefore, SS block measurement is required for SSTD measurement, and the required measurement gap length is increased.

Accordingly, in order to efficiently execute the LTE-NR asynchronous DC, for example, it is necessary to perform a measurement procedure that does not have a mechanism for measuring the timing difference on the network side and avoids the communication unavailable state in the serving cell due to the increased measurement gap length.

As the measurement procedure, there is a procedure that enables the SSTD measurement to be configured to the user apparatus 200 before the PSCell configuration. For example, the SSTD measurement is configured to the user apparatus 200 before configuring the PSCell according to the information element "report-interRAT-SSTD-Meas". According to the information element "report-interRAT-SSTD-Meas", the user apparatus 200 measures the SSTD between the PCell and the detected inter-RAT cell. Some or all of the following parameters can be configured from the Measurement object, etc.

1) Measurement target frequency and SS Block frequency position
2) SS burst set periodicity
3) SMTC cycle and period, and one of {5, 10, 20, 40, 80, 160} ms as the SMTC window period
4) SS block sub-carrier spacing
5) Number of cells reported
6) Reporting period and number of reporting times, etc.
7) Reporting contents With respect to information of 1) the measurement target frequency and SS Block frequency position, 2) SS burst set periodicity, 3) SMTC cycle and period, and one of {5, 10, 20, 40, 80, 160} ms as the SMTC window period, and 4) SS block sub-carrier spacing, PCell acquires, in advance, information about an NR cell that may serve as a PSCell around the PCell, so that the parameters are indicated to the user apparatus 200. The information of 1) through 4) is semi-static information about the surrounding NR cells, and the measurement gap can be shortened when detecting the NR cells by acquiring the information at the user apparatus 200.

5) With respect to the number of cells reported, in the case where multiple cells are configured, multiple cell IDs and the SSTD measurement result for each cell may be reported.

6) With respect to the reporting period and the number of reporting times, etc., a periodic report may be configured or the number of reporting times may be configured. For example, the user apparatus 200 may perform reporting even if the NR cell is not detected at the target frequency, and may stop the measurement report after a predetermined number of times has been reached or a predetermined time has elapsed, or the user apparatus 200 may stop the measurement report after a predetermined time has elapsed without reporting.

7) With respect to the reporting contents, in addition to the SSTD measurement results, some or all of the detected cell's RSRP (Reference Signal Received Power), RSRQ (Reference Signal Received Quality), SINR (Signal-to-Interference plus Noise power Ratio), beam ID, or RSRP may be configured to be reported.

In addition, based on the information of the SS burst set periodicity applied to the secondary node, an Inter-RAT SSTD measurement with a measurement gap may be configured to the user apparatus 200 by the master node. With respect to the measurement gap length, for example, a value of {5, 10, 20, 40, 80, 160} ms plus 1 ms of returning time may be configured. With respect to the measurement gap period, for example, {40, 80} ms may be configured, or other values may be configured.

In serving cells in which a measurement gap for the Inter-RAT SSTD measurement is configured, it is not necessary for reception of PDSCH or PDCCH and transmission of PUCCH or PUSCH, etc., within the measurement gap to be performed.

The measurement gap for the Inter-RAT SSTD measurement is configured separately from the measurement gap for the normal inter-frequency measurement or the inter-RAT measurement. In the case where multiple measurement gaps overlap, the user apparatus 200 may prioritize (give higher priority to) the measurement gap for the Inter-RAT SSTD measurement, or may prioritize the measurement gap for the normal inter-frequency measurement or the inter-RAT measurement.

In the case where a measurement gap for the Inter-RAT SSTD measurement is configured for PCell belonging to the master node and carrier-aggregated SCell, an SCell deactivation timer may be stopped. The deactivation timer is stopped to prevent the SCell from being deactivated due to the measurement gap for the Inter-RAT STD measurement.

Further, in the case where the Inter-RAT SSTD measurement is configured by the master node, the user apparatus 200 may measure the target frequency by operation equivalent to intra-frequency measurement. In other words, the user apparatus 200 has the ability to measure the target frequency without a measurement gap. The user apparatus 200 performs an SSTD measurement based on the configured timings of the PCell, e.g., the timing, period, or cycle of the SMTC.

It should be noted that it may be assumed that an interruption occurs temporarily in the serving cell at the time when the Inter-RAT SSTD measurement is configured, that is, the start time of the SMTC window. Interruption occurs in the user apparatus 200, for example, due to the switching time of the RF module. However, SSTD measurements of surrounding NR cells can be made without configuring a large measurement gap.

Here, it may be assumed that no further interruption occurs in the case where PSCell is configured to the user apparatus 200 based on the SSTD measurement result report. This is because the report obtained in SSTD measurements can be used to configure PSCell.

Further, the Inter-RAT SSTD measurement report may also contain the following information.
1) Detected cell ID
2) SFN offset
3) Frame boundary offset
4) Slot boundary offset
5) Measurement result related to electric power
6) Beam ID 1) With respect to the detected cell ID, the user apparatus 200 may report a plurality of cell IDs up to the configured number of reporting cells.

2) With respect to the SFN offset, the user apparatus 200 may report the SFN offset for each cell.

3) With respect to the frame boundary offset, the user apparatus 200 may report the frame boundary offset for each cell. The bit width indicating the offset information may be changed according to the sub-carrier spacing of the configured SS Block. For example, the user apparatus 200 reports a slot index in the NR cell that matches the timing of the boundary of the PCell sub-frame #0.

4) With respect to the slot boundary offset, the user apparatus 200 may report the slot boundary offset for each cell. The bit width indicating the offset information may be changed according to the sub-carrier spacing of the configured SS Block. For example, the user apparatus 200 reports an index of symbol units in the NR cell that matches the timing of the PCell sub-frame boundary.

5) With respect to the measurement result related to electric power, the measurement result may be, for example, RSRP, RSRQ, and SINR, and reported on a cell-by-cell basis. RSRP, RSRQ, and SINR may be reported for each beam in the case where the report of the beam measurement results is configured to (at) the user apparatus 200.

6) With respect to the beam ID, the beam ID is reported in the case where a beam measurement result report is configured to (in) the user apparatus 200.

The above-described SSTD measurement is performed before the PSCell is configured, but the above-described SSTD measurement may also be performed after the PSCell is configured. In the SSTD measurement, the timing difference between the PCell and the configured PSCell is measured and reported.

Figure 5:
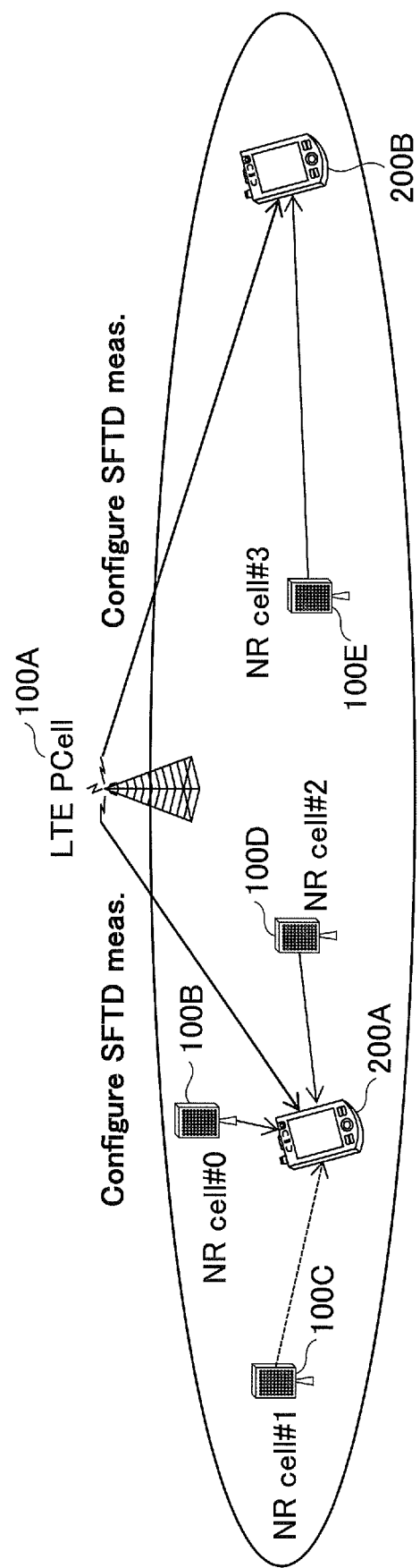
FIG. 5 is a drawing illustrating an example (3) of a measurement procedure in an asynchronous DC according to an embodiment of the present invention.

FIG. 5 is a drawing illustrating an example (3) of a measurement procedure in an asynchronous DC according to an embodiment of the present invention. Referring to FIG. 5, an example of configuring an SFTD measurement in a network in which an LTE carrier and an NR carrier are asynchronous will be described.

The user apparatus 200, in which the SFTD measurement is configured, reports the timing difference information with the LTE PCell by searching for the NR cell and acquiring the SFN and frame timing of the detected NR cell in the specified frequency carrier. However, it was not clear under what conditions the SFTD measurement results for which NR cell should be reported to the base station apparatus 100.

Accordingly, the conditions for reporting the SFTD measurement results (e.g., SFTD with respect to which cell should be reported in a case where a plurality of NR cells are detected) are predefined or indicated to the user apparatus 200 by the base station apparatus 100. Such conditions relate to at least the maximum number of NR cells to be reported or the reception strength of the NR cells to be reported.

Here, for example, with respect to the NR cell with the highest reception strength, a case will be discussed in which the user apparatus 200 reports SFTD and PCI (Physical Cell Identifier) to the base station apparatus 100. In the case where an SFTD measurement report is performed only for a single NR cell with the highest reception strength, there may be a case in which the SFTD measurement report is made because no higher NR cell was detected, even though the reception strength (RSRP) of the NR cell is low as an absolute value. In this case, if the network configures the reported NR cell as PSCell for the user apparatus 200, the reception strength may be insufficient, and there is a possibility that sufficient throughput cannot be obtained even if EN-DC (E-UTRA-NR DC) is performed. In other words, the signaling, processing, or battery power required for the PSCell configuration is not effectively used.

Also, for example, in the case where the SFTD measurement report is performed only for a single NR cell with the highest reception strength in spite of the fact that a plurality of NR cells whose reception strength is sufficiently high are detected, a candidate that can be configured as PSCell for the user apparatus 200 by the network is limited to only the reported NR cell. For example, it may be desirable to report a plurality of NR cells that are PSCell candidates with sufficient reception strength in case of assuming a situation in which the reported NR cell is congested with many other user apparatuses 200 and other detected NR cells are not congested at all.

Accordingly, the following conditions related to SFTD measurements and reports are either predefined or indicated to the user apparatus 200 via signaling. It should be noted that the "target cell for SFTD measurement and reporting" may be the "target cell for SFTD measurement or reporting". For example, the number of cells reported for SFTD may be less than the number of cells measured for SFTD, or the number of cells measured for SFTD may be the same as the number of cells reported for SFTD.

1) Number of cells for which SFTD measurement and reporting are performed

For example, in the case where the number of cells for which SFTD measurement and reporting are performed is defined or indicated as "2 cells", the user apparatus 200 may perform SFTD measurement and reporting on at least 2 cells detected by the user apparatus 200. Further, the user apparatus 200 may select two cells from the cells detected by the user apparatus 200 in the descending order of high reception strength to perform SFTD measurements and reports.

2) Upper limit of the number of cells for which SFTD measurement and reporting are performed For example, in the case where the number of cells detected by the user apparatus 200 is less than the upper limit, SFTD measurements and reporting are performed for all detected cells.

In the case where the number of cells detected by the user apparatus 200 is greater than the upper limit, SFTD measurements and reporting are performed for the highest reception strength cells among the detected cells which are equal in number to the upper limit.

3) Lower limit of the reception strength (RSRP) of the target cells for which SFTD measurement and reporting are performed For example, of all the cells detected by the user apparatus 200, SFTD measurement and reporting are performed only for the cells whose RSRP exceeds the lower limit of the RSRP. Alternatively, the user apparatus 200 may report that, with respect to the cells whose RSRP is lower than the lower limit of the RSRP, RSRP of the cells is lower than the lower limit of the RSRP at the time of the SFTD report. Alternatively, only the cells detected as having an RSRP within a predetermined difference, compared to the cell with the highest RSRP among the cells detected by the user apparatus 200, may be included in the SFTD reporting.

It should be noted that combined conditions described in 1), 2) and 3) above may be defined or indicated to the user apparatus 200 as conditions for SFTD measurement and reporting.

As illustrated in FIG. 5, SFTD measurement is configured to (for) the user apparatus 200A or the user apparatus 200B by the base station apparatus 100A that is an LTE PCell. An example will be described in which the user apparatus 200A performs SFTD measurement on the base station apparatus 100B as an NR cell #0 and the base station apparatus 100D as an NR cell #2, based on the above-described conditions for SFTD measurement and reporting. It should be noted that it is assumed that the user apparatus 200A detects the base station apparatus 100B as an NR cell #0, the base station apparatus 100C as an NR cell #1, and the base station apparatus 100D as an NR cell #2, and it is assumed that, with respect to the reception strength, the user apparatus 200A detects that the NR cell #0 is −50 dBm, the NR cell #1 is −80 dBm, and the NR cell #2 is −65 dBm.

For example, in the case where the number of target cells for SFTD measurement and reporting is defined or indicated as 2 cells with higher reception strength, because NR cell #0 and NR cell #2 are two cells with stronger reception strength, SFTD measurements and reporting are performed by the user apparatus 200 with respect to NR cell #0 and NR cell #2. Further, for example, in the case where the number of target cells for SFTD measurement and reporting is defined or indicated as 3 cells from a higher reception strength, SFTD measurements and reporting are performed with respect to NR cell #0, NR cell #1, and NR cell #2.

For example, in the case where the reception strength of the target cells for SFTD measurement and reporting is defined or indicated to be greater than −75 dBm, SFTD measurement and reporting are performed with respect to NR cell #0 and NR cell #2. Further, for example, in the case where the reception strength of the target cell for SFTD measurement and reporting is defined or indicated to be greater than −60 dBm, SFTD measurement and reporting are performed with respect to only NR cell #0.

For example, in the case where the target cell for SFTD measurement and reporting is defined or indicated as a cell within 20 dB of the highest reception strength of the detected cells, SFTD measurements and reporting are performed with respect to NR cell #0 and NR cell #2. Further, for example, in the case where the target cell for SFTD measurement and reporting is defined or indicated as a cell within 10 dB of the highest reception strength of the detected cells, SFTD measurement and reporting are performed with respect to only NR cell #0.

In the above-described embodiment, in the case where a plurality of NR cells are detected by the user apparatus 200 based on the SFTD measurement configuration that is predefined or indicated by the base station apparatus 100, it is possible for the user apparatus 200 to determine under what conditions the SFTD measurement is performed and reported to the base station apparatus 100.

In other words, it is possible for the user apparatus to perform measurements for dual connectivity performed in a wireless communication system using multiple RATs.

Apparatus Structure

Next, examples of functional structures of the base station apparatus 100 and the user apparatus 200 that perform the processes and operations described above will be described. The base station apparatus 100 and the user apparatus 200 each have at least functions for performing an embodiment of the present invention. It should be noted that the base station apparatus 100 and the user apparatus 200 each may have only a part of the functions for performing an embodiment of the present invention.

Figure 6:
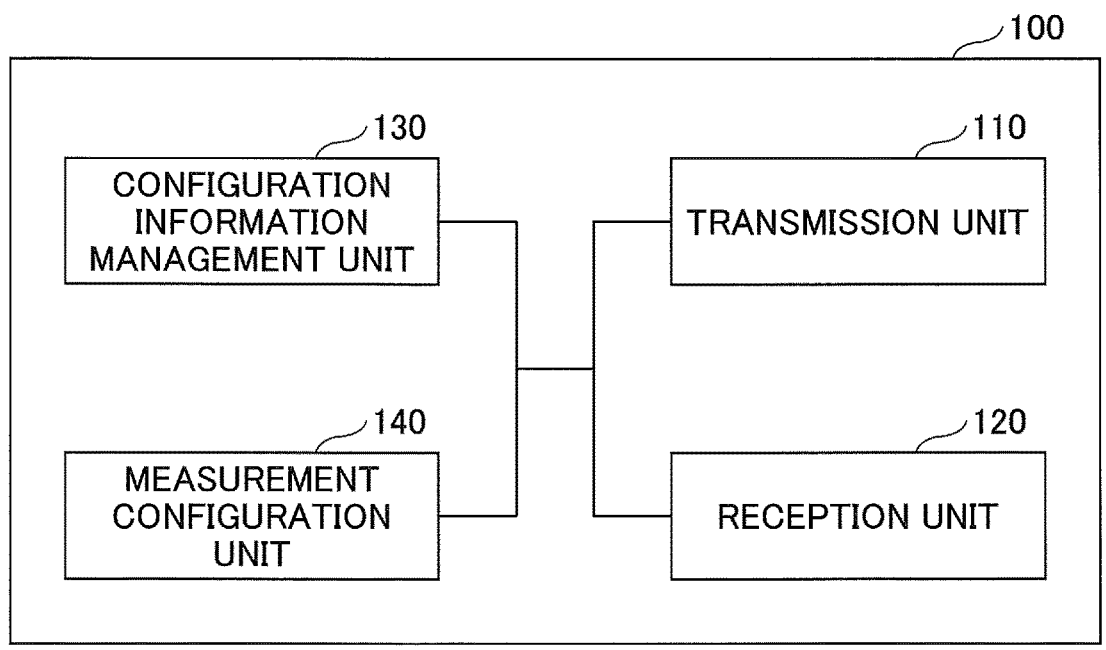
FIG. 6 is a drawing illustrating an example of a functional structure of a base station apparatus 100 according to an embodiment of the present invention.

FIG. 6 is a drawing illustrating an example of a functional structure of a base station apparatus 100. As illustrated in FIG. 6, the base station apparatus 100 includes a transmission unit 110, a reception unit 120, a configuration information management unit 130, and a measurement configuration unit 140. The functional structure illustrated in FIG. 6 is merely an example. Functional divisions and names of functional units may be anything as long as it can perform operations according to an embodiment of the present invention.

The transmission unit 110 has a function for generating a signal to be transmitted to the user apparatus 200 and for transmitting the signal wirelessly. The reception unit 120 has a function for receiving various signals transmitted from the user apparatus 200 and for obtaining, for example, upper layer information from the received signals. Further, the transmission unit 110 has a function for transmitting, to the user apparatus 200, NR-PSS, NR-SSS, NR-PBCH, DL/UL control signals, etc. Further, the transmission unit 110 transmits, to the user apparatus 200, information related to transmission power control, information related to scheduling, and information related to measurement configuration; and the reception unit 120 receives, from the user apparatus 200, a message related to a measurement result report.

The configuration information management unit 130 stores preset configuration information and various configuration information items to be transmitted to the user apparatus 200. Contents of the configuration information are, for example, information related to measurement of the user apparatus 200, etc.

The measurement configuring unit 140 performs: control pertaining to generation of information used for configuration of measurements performed by the user apparatus 200; and control pertaining to processing of measurement results received from the user apparatus 200.

Figure 7:
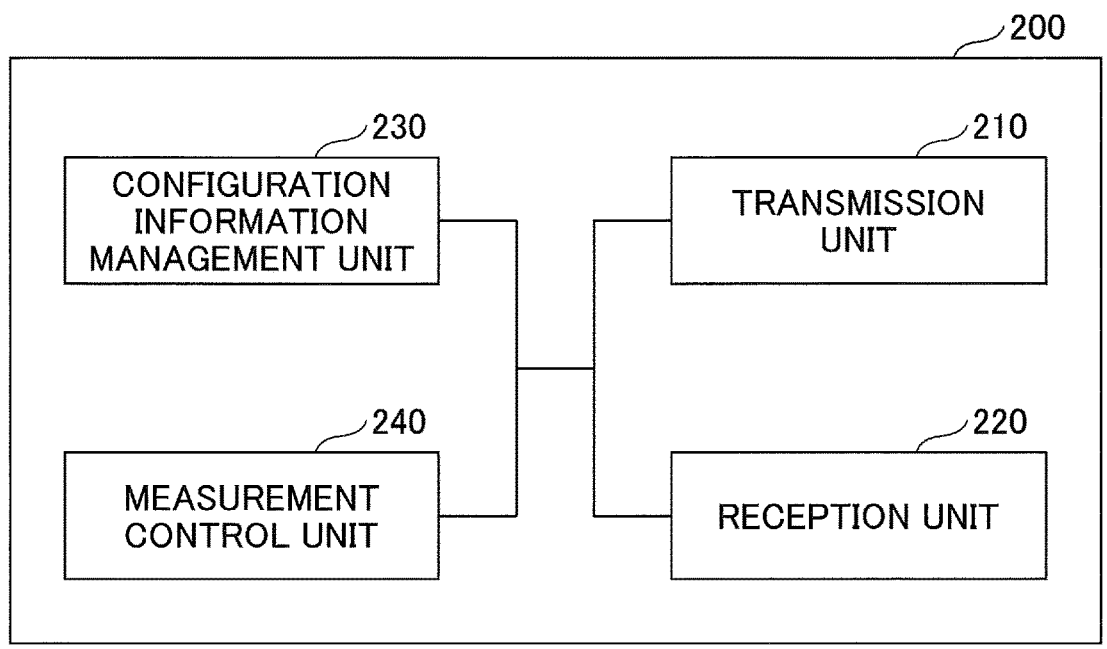
FIG. 7 is a drawing illustrating an example of a functional structure of a user apparatus 200 according to an embodiment of the present invention.

FIG. 7 is a drawing illustrating an example of a functional structure of a user apparatus 200. As illustrated in FIG. 7, the user apparatus 200 includes a transmission unit 210, a reception unit 220, a configuration information management unit 230, and a measurement control unit 240. The functional structure illustrated in FIG. 7 is merely an example. Functional divisions and names of functional units may be anything as long as it can perform operations according to an embodiment of the present invention.

The transmission unit 210 generates a transmission signal from transmission data and transmits the transmission signal wirelessly. The reception unit 220 receives various signals wirelessly and obtains upper layer signals from the received physical layer signals. Further, the reception unit 220 has a function for receiving NR-PSS, NR-SSS, NR-PBCH, DL/UL control signals, etc., transmitted from the base station apparatus 100. Further, the transmission unit 210 transmits, to the base station apparatus 100, a message related to a measurement result report, and the reception unit 220 receives, from the base station apparatus 100, information to be used for measurement configuration.

The configuration information management unit 230 stores various configuration information items received by the reception unit 220 from the base station apparatus 100. Further, the configuration information management unit 230 also stores preset configuration information. Contents of the configuration information are, for example, information related to configuration for performing the measurements, etc.

The measurement control unit 240 performs control pertaining to performing the measurement by the user apparatus 200 described in an embodiment of the present invention. It should be noted that the functional units related to measurement result transmission, etc., in the measurement control unit 240 may be included in the transmission unit 210, and the functional units related to configuration reception related to the measurement in the measurements control unit 240 may be included in the reception unit 220.

Hardware Structure

In the above functional structure diagrams used for describing an embodiment of the present invention (FIG. 6 and FIG. 7), functional unit blocks are shown. The functional blocks (function units) are realized by a freely-selected combination of hardware and/or software. Further, realizing means of each functional block is not limited in particular. In other words, each functional block may be realized by a single apparatus in which multiple elements are coupled physically and/or logically, or may be realized by two or more apparatuses that are physically and/or logically separated and are physically and/or logically connected (e.g., wired and/or wireless).

Figure 8:
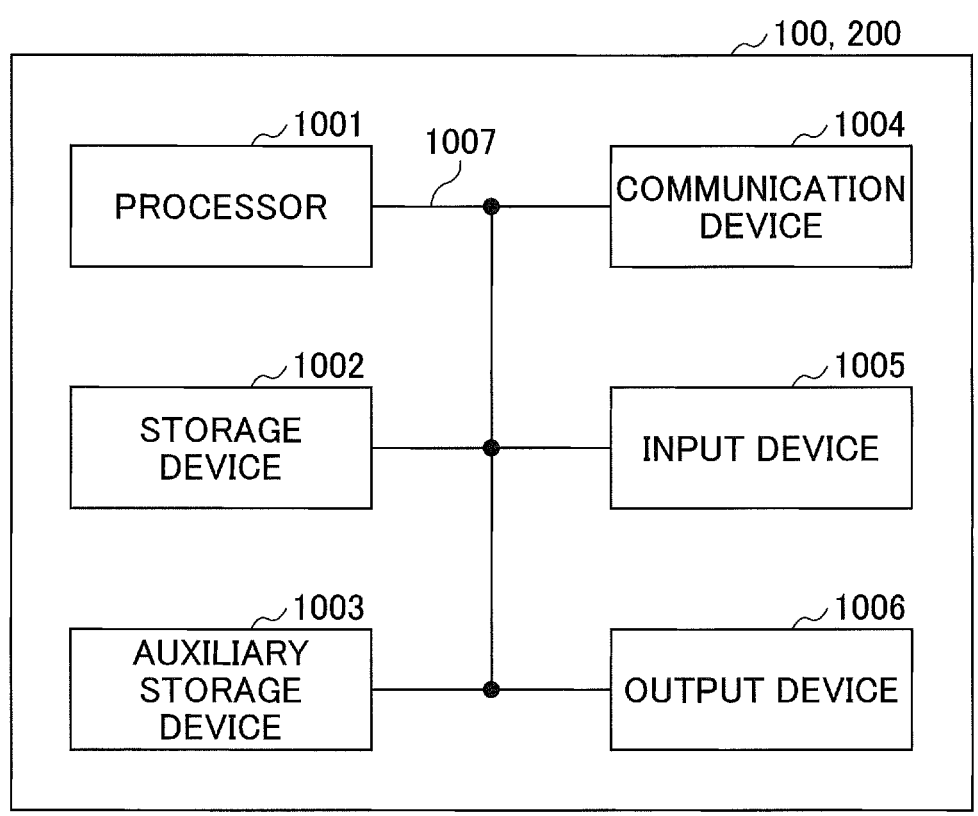
FIG. 8 is a drawing illustrating examples of hardware structures of the base station apparatus 100 and the user apparatus 200.

Further, for example, a base station apparatus 100 and a user apparatus 200 according to an embodiment of the present invention may function as computers that perform processes according to an embodiment of the present invention. FIG. 8 is a drawing illustrating an example of a hardware structure of a wireless communication apparatus that is a base station apparatus 100 or a user apparatus 200 according to an embodiment of the present invention. Each of the base station apparatus 100 and the user apparatus 200 may be physically a computer apparatus including a processor 1001, a storage device 1002, an auxiliary storage device 1003, a communication device 1004, an input device 1005, an output device 1006, a bus 1007, etc.

It should be noted that, in the descriptions below, the term "apparatus" can be read as a circuit, a device, a unit, etc. The hardware structures of the base station apparatus 100 and the user apparatus 200 may include one or more of each of the devices indicated by 1001 to 1006 illustrated in the figure, or may not include some apparatuses.

Each of the functions of the base station apparatus 100 and the user apparatus 200 is realized by causing predetermined software (program) to be read by hardware such as the processor 1001, the storage device 1002, or the like, by causing the processor 1001 to perform calculations, and by causing the processor 1001 to control communications by the communication device 1004, and to control reading and/or writing data by the storage device 1002 and the auxiliary storage device 1003.

The processor 1001 controls the entire computer by, for example, controlling the operating system. The processor 1001 may include a central processing unit (CPU) including an interface with a peripheral apparatus, a control apparatus, a calculation apparatus, a register, etc.

Further, the processor 1001 reads a program (program code), a software module, or data from the auxiliary storage device 1003 and/or the communication device 1004, writes the program, the software module, or the data to the storage device 1002, and performs various processes according to the program, the software module, or the data. As the program, a program is used that causes the computer to perform at least a part of operations according to an embodiment of the present invention described above. For example, the transmission unit 110, the reception unit 120, the configuration information management unit 130, and the measurement control unit 140 of the base station apparatus 100 illustrated in FIG. 6 may be realized by control programs that are stored in the storage device 1002 and are executed by the processor 1001. Further, for example, the transmission unit 210, the reception unit 220, the configuration information management unit 230, and the measurements control unit 240 of the user apparatus 200 illustrated in FIG. 7 may be realized by control programs that are stored in the storage device 1002 and are executed by the processor 1001. The various processes have been described to be performed by a single processor 1001. However, the processes may be performed by two or more processors 1001 simultaneously or sequentially. The processor 1001 may be implemented by one or more chips. It should be noted that the program may be transmitted from a network via a telecommunication line.

The storage device 1002 is a computer-readable recording medium, and may include at least one of a ROM (Read Only Memory), an EPROM (Erasable Programmable ROM), an EEPROM (Electrically Erasable Programmable ROM), a RAM (Random Access Memory), etc. The storage device 1002 may be referred to as a register, a cache, a main memory, etc. The storage device 1002 is enabled to store programs (program codes), software modules, or the like, that are executable for performing processes according to an embodiment of the present invention.

The auxiliary storage device 1003 is a computer-readable recording medium, and may include at least one of, for example, an optical disk such as a CD-ROM (Compact Disc ROM), a hard disk drive, a flexible disk, a magneto optical disk (e.g., compact disk, digital versatile disk, Blu-ray (registered trademark) disk), a smart card, a flash memory (e.g., card, stick, key drive), a floppy (registered trademark) disk, a magnetic strip, etc. The above recording medium may be a database including the storage device 1002 and/or the auxiliary storage device 1003, a server, or any other appropriate medium.

The communication device 1004 is hardware (transmission and reception device) for communicating with computers via a wired and/or wireless network, and may be referred to as a network device, a network controller, a network card, a communication module, etc. For example, the transmission unit 110 and the reception unit 120 of the base station apparatus 100 may be realized by the communication device 1004. Further, the transmission unit 210 and the reception unit 220 of the user apparatus 200 may be realized by the communication device 1004.

The input device 1005 is an input device that receives an external input (e.g., keyboard, mouse, microphone, switch, button, sensor). The output device 1006 is an output device that outputs something to the outside (e.g., display, speaker, LED lamp). It should be noted that the input device 1005 and the output device 1006 may be integrated into a single device (e.g., touch panel).

Further, the apparatuses including the processor 1001, the storage device 1002, etc., are connected to each other via the bus 1007 used for communicating information. The bus 1007 may include a single bus, or may include different buses between the apparatuses.

Further, each of the base station apparatus 100 and the user apparatus 200 may include hardware such as a microprocessor, a digital signal processor (DSP), an ASIC (Application Specific Integrated Circuit), a PLD (Programmable Logic Device), a FPGA (Field Programmable Gate Array), etc., and a part or all of each functional block may be realized by the hardware. For example, the processor 1001 may be implemented by at least one of the above hardware elements.

Embodiment Summary

As described above, according to an embodiment of the present invention, a user apparatus for communicating with a first base station apparatus using a first RAT and a second base station apparatus using a second RAT different from the first RAT is provided. The user apparatus includes a reception unit configured to receive, from the first base station apparatus, a configuration for measuring a timing difference between the first base station apparatus and the second base station apparatus; a control unit configured to perform measurement with respect to the second base station apparatus based on the configuration for measuring the timing difference; and a transmission unit configured to transmit, to the first base station apparatus, a result of the performed measurement, wherein the configuration for measuring the timing difference includes information indicating which of one or more of the second base stations is to be a measurement target.

According to the above arrangement, it is possible for the user apparatus 200 to determine an NR cell to be measured and to measure the SFTD among the detected NR cells based on the configuration for measuring the SFTD indicated by the base station apparatus 100. In other words, it is possible for the user apparatus to perform measurements for dual connectivity performed in a wireless communication system using multiple RATs.

The information indicating which of the one or more of the second base station apparatuses is to be measured may include information indicating the number of the second base station apparatuses to be measured or information indicating an upper limit of the number of the second base station apparatuses to be measured. According to the above arrangement, it is possible for the user apparatus 200 to perform SFTD measurement on a desired number of NR cells and to perform reporting to the base station apparatus 100.

The information indicating which of the one or more of the second base station apparatuses is to be measured may include information indicating that the detected second base station apparatuses are to be measured in order from the highest reception strength. According to the above arrangement, it is possible for the user apparatus 200 to perform SFTD measurement on a desired number of NR cells in order from the highest reception strength and to perform reporting to the base station apparatus 100.

The information indicating which of the one or more of the second base station apparatuses is to be measured may include information indicating a lower limit of the reception strength of a signal transmitted from the second base station apparatus to be measured. According to the above arrangement, it is possible for the user apparatus 200 to perform SFTD measurement on NR cells that exceed a predetermined reception strength and to perform reporting to the base station apparatus 100.

The information indicating which of the one or more of the second base station apparatuses is to be measured may include information indicating that the second base station apparatus having the highest reception strength among the detected second base station apparatuses and the second base station apparatus having a reception strength within a predetermined difference from the highest received strength are to be measured. According to the above arrangement, it is possible for the user apparatus 200 to perform SFTD measurement on NR cells that are within a predetermined reception strength from the highest detected reception strength and to perform reporting to the base station apparatus 100.

The information indicating which of the one or more of the second base station apparatuses is to be measured may include information indicating to report, to the first base station apparatus, the detected second base station apparatus having a reception strength below the lower limit of the reception strength. According to the above arrangement, it is possible for the user apparatus 200 to report to the base station apparatus 100 that there exist NR cells below a predetermined reception strength. It is possible for the base station apparatus 100 to indicate, to the user apparatus 200, a configuration that reduces the reception strength of the target cell to perform the SFTD measurement based on the report.

Further, according to an embodiment of the present invention, a user apparatus for communicating with a first base station apparatus using a first RAT (Radio Access Technology) and a second base station apparatus using a second RAT is provided. The user apparatus includes a reception unit configured to receive, from the first base station apparatus, a configuration for measuring a timing difference between a cell of the first base station apparatus and a cell of the second base station apparatus; a control unit configured to perform measurement with respect to a cell of the second RAT based on the configuration for measuring the timing difference; and a transmission unit configured to transmit, to the first base station apparatus, a result of the performed measurement, wherein the configuration for measuring the timing difference includes information indicating an upper limit of a number of cells of the second RAT.

According to the above arrangement, it is possible for the user apparatus 200 to determine an NR cell to be measured and to measure the SFTD among the detected NR cells based on the configuration for measuring the SFTD indicated by the base station apparatus 100. In other words, it is possible for the user apparatus to perform measurements for dual connectivity performed in a wireless communication system using multiple RATs.

The configuration for measuring the timing difference may include information indicating a cell of the second RAT to be measured. According to the above arrangement, it is possible for the user apparatus 200 to perform SFTD measurement on a desired number of NR cells and to perform reporting to the base station apparatus 100.

The measurement may be performed on up to a predetermined number of cells of the detected second RAT cells in order from the highest reception strength. According to the above arrangement, it is possible for the user apparatus 200 to perform SFTD measurement on NR cells in order from the highest reception strength and to perform reporting to the base station apparatus 100.

The measurement may be performed on cells which exceed a lower limit of the reception strength of a signal transmitted from the detected second RAT cells. According to the above arrangement, it is possible for the user apparatus 200 to perform SFTD measurement on NR cells that exceed a predetermined reception strength and to perform reporting to the base station apparatus 100.

Supplement of Embodiment

As described above, one or more embodiments have been described. The present invention is not limited to the above embodiments. A person skilled in the art should understand that there are various modifications, variations, alternatives, replacements, etc., of the embodiments. In order to facilitate understanding of the present invention, specific values have been used in the description. However, unless otherwise specified, those values are merely examples and other appropriate values may be used. The division of the described items may not be essential to the present invention. The things that have been described in two or more items may be used in a combination if necessary, and the thing that has been described in one item may be appropriately applied to another item (as long as there is no contradiction). Boundaries of functional units or processing units in the functional block diagrams do not necessarily correspond to the boundaries of physical parts. Operations of multiple functional units may be physically performed by a single part, or an operation of a single functional unit may be physically performed by multiple parts. The order of sequences and flowcharts described in an embodiment of the present invention may be changed as long as there is no contradiction. For the sake of description convenience, a base station apparatus 100 and a user apparatus 200 have been described by using functional block diagrams. However, the apparatuses may be realized by hardware, software, or a combination of hardware and software. The software executed by a processor included in a base station apparatus 100 according to an embodiment of the present invention and the software executed by a processor included in a user apparatus 200 according to an embodiment of the present invention may be stored in a random access memory (RAM), a flash memory, a read only memory (ROM), an EPROM, an EEPROM, a register, a hard disk (HDD), a removable disk, a CD-ROM, a database, a server, or any other appropriate recording medium.

Further, information transmission (notification, reporting) may be performed not only by methods described in an aspect/embodiment of the present specification but also a method other than those described in an aspect/embodiment of the present specification. For example, the information transmission may be performed by physical layer signaling (e.g., DCI (Downlink Control Information), UCI (Uplink Control Information)), upper layer signaling (e.g., RRC signaling, MAC signaling, broadcast information (MIB (Master Information Block), SIB (System Information Block))), other signals, or combinations thereof. Further, an RRC message may be referred to as RRC signaling. Further, an RRC message may be, for example, an RRC connection setup message, an RRC connection reconfiguration message, or the like.

An aspect/embodiment described in the present specification may be applied to a system that uses LTE (Long Term Evolution), LTE-A (LTE-Advanced), SUPER 3G, IMT-Advanced, 4G, 5G, FRA (Future Radio Access), W-CDMA (registered trademark), GSM (registered trademark), CDMA2000, UMB (Ultra Mobile Broadband), IEEE 802.11 (Wi-Fi), IEEE 802.16 (WiMAX), IEEE 802.20, UWB (Ultra-WideBand), Bluetooth (registered trademark), other appropriate systems, and/or a next generation system enhanced based thereon.

The order of processing steps, sequences or the like of an aspect/embodiment described in the present specification may be changed as long as there is no contradiction. For example, in a method described in the present specification, elements of various steps are presented in an exemplary order. The order is not limited to the presented specific order.

The particular operations, that are supposed to be performed by the base station apparatus 100 in the present specification, may be performed by an upper node in some cases. In a network including one or more network nodes including a base station apparatus 100, it is apparent that various operations performed for communicating with a user apparatus 200 may be performed by the base station apparatus 100 and/or another network node other than the base station apparatus 100 (for example, but not limited to, MME or S-GW). According to the above, a case is described in which there is a single network node other than the base station apparatus 100. However, a combination of multiple other network nodes may be considered (e.g., MME and S-GW).

An aspect/embodiment described in the present specification may be used independently, may be used in combination, or may be used by switching according to operations.

There is a case in which the user apparatus 200 may be referred to, by a person skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other appropriate terms.

There is a case in which the base station apparatus 100 may be referred to, by a person skilled in the art, as a NB (NodeB), an eNB (enhanced NodeB), a gNB, a base station, or some other appropriate terms.

As used herein, the term "determining" may encompasses a wide variety of actions. The "determining" may include, for example, a case in which "judging", "calculating", "computing", "processing", "deriving", "investigating", "looking up" (e.g., looking up a table, database, or other data structures), or "ascertaining" is deemed as "determining". Also, "determining" may include a case in which "receiving" (e.g., receiving information), "transmitting" (e.g., transmitting information), "inputting", "outputting", or "accessing" (e.g., accessing data in a memory) is deemed as "determining". Further, the "determining" may include a case in which "resolving", "selecting", "choosing", "establishing", "comparing", or the like is deemed as "determining". In other words, the "determining" may include a case in which a certain action or operation is deemed as "determining".

The description "based on" used in the present specification does not mean "based on only" unless otherwise specifically noted. In other words, the phrase "base on" means both "based on only" and "based on at least".

When the terms "include", "including", and variations thereof are used in the present specification or in the claims, the terms are intended to be non-restrictive (to be considered "open terminology") the same as the term "comprising". Further, the term "or" used in the present specification or in the claims is intended to be not an "exclusive or".

Throughout the present specification, in the case where articles "a", "an", and "the" are added to a noun as a result of translation, unless otherwise indicated, the noun may be plural.

It should be noted that, in an embodiment of the present invention, the measurement control unit 240 is an example of a control unit. The measurement configuration unit 140 is an example of a configuration unit.

As described above, the present invention has been described in detail. It is apparent to a person skilled in the art that the present invention is not limited to one or more embodiments of the present invention described in the present specification. Modifications, alternatives, replacements, etc., of the present invention may be possible without departing from the subject matter and the scope of the present invention defined by the descriptions of claims. In other words, the descriptions of the present specification are for illustrative purposes only, and are not intended to be limitations to the present invention.

The present application is based on and claims priority to Japanese patent application No. 2018-036377 filed on Mar. 1, 2018, the entire contents of which are hereby incorporated herein by reference.

DESCRIPTION OF THE REFERENCE NUMERALS

100 Base station apparatus
200 User apparatus
110 Transmission unit
120 Reception unit
130 Configuration information management unit
140 Measurement configuration unit
200 User apparatus
210 Transmission unit
220 Reception unit
230 Configuration information management unit
240 Measurement control unit
1001 Processor
1002 Storage device
1003 Auxiliary storage device
1004 Communication device
1005 Input device
1006 Output device

What is claimed is:

1. A terminal comprising:
a receiver configured to receive, from a base station apparatus of a cell of a first Radio Access Technology (RAT), measurement information indicating a measurement target in a second RAT;
a processor configured to
determine whether information indicating an upper limit of a number of measurement target cells exists in the measurement information, and
in a case where the information indicating the upper limit of the number of measurement target cells does not exist, perform a System Frame Number and Frame Timing Difference (SFTD) measurement between the cell of the first RAT and a predetermined number of cells of the second RAT, wherein the SFTD measurement is performed in a descending order from the highest reception strength; and
a transmitter configured to transmit a result of the measurement to the base station apparatus.

2. The terminal according to claim 1, wherein the processor performs the SFTD measurement with respect to a cell of the second RAT indicated by the information indicating the upper limit of the number of the measurement target cells.

3. The terminal according to claim 1, wherein the processor performs the SFTD measurement by having the measurement target cells exceeding a lower limit of reception strength of a signal transmitted from a cell of the second RAT.

4. A communication method of a terminal, the communication method comprising:
receiving, from a base station apparatus of a cell of a first Radio Access Technology (RAT), measurement information indicating a measurement target in a second RAT;
determining whether information indicating an upper limit of a number of measurement target cells exists in the measurement information, and
in a case where the information indicating the upper limit of the number of measurement target cells does not exist, performing an System Frame Number and Frame Timing Difference (SFTD) measurement between the cell of the first RAT and a predetermined number of cells of the second RAT, wherein the SFTD measurement is performed in a descending order from the highest reception strength; and
transmitting a result of the measurement to the base station apparatus.

* * * * *